United States Patent
Huang

(10) Patent No.: US 11,480,288 B2
(45) Date of Patent: Oct. 25, 2022

(54) CLAMPING HOLDER

(71) Applicant: Ming-Hsien Huang, New Taipei (TW)

(72) Inventor: Ming-Hsien Huang, New Taipei (TW)

( * ) Notice: Subject to any disclaimer, the term of this patent is extended or adjusted under 35 U.S.C. 154(b) by 0 days.

(21) Appl. No.: 17/325,188

(22) Filed: May 19, 2021

(65) Prior Publication Data
US 2022/0026012 A1    Jan. 27, 2022

Related U.S. Application Data

(60) Provisional application No. 63/119,654, filed on Dec. 1, 2020, provisional application No. 63/056,724, filed on Jul. 27, 2020.

(30) Foreign Application Priority Data

Jan. 20, 2021    (TW) .................................. 110200697

(51) Int. Cl.
*F16M 11/04* (2006.01)
*F16M 11/18* (2006.01)

(52) U.S. Cl.
CPC .......... *F16M 11/046* (2013.01); *F16M 11/041* (2013.01); *F16M 11/18* (2013.01); *F16M 2200/028* (2013.01)

(58) Field of Classification Search
USPC ..... 248/227.2, 231.41, 231.61, 316.4, 316.6, 248/918, 919, 917, 920, 121, 122.1, 248/123.11, 123.2, 124.2
See application file for complete search history.

(56) References Cited

U.S. PATENT DOCUMENTS

| | | | |
|---|---|---|---|
| 6,370,741 B1 * | 4/2002 | Lu .................... | A47B 21/045 24/523 |
| 6,418,010 B1 * | 7/2002 | Sawyer ................ | F16M 11/14 361/801 |
| 6,478,375 B2 * | 11/2002 | Richardson ............. | A47C 4/24 297/16.1 |
| 6,769,657 B1 * | 8/2004 | Huang ................. | F16M 13/022 248/278.1 |
| 6,857,610 B1 * | 2/2005 | Conner ............... | F16M 13/022 248/291.1 |
| 7,121,516 B1 * | 10/2006 | Koh .................... | F16M 13/022 248/227.2 |

(Continued)

FOREIGN PATENT DOCUMENTS

CN    205298973    6/2016

*Primary Examiner* — Alfred J Wujciak
(74) *Attorney, Agent, or Firm* — JCIPRNET

(57) ABSTRACT

A clamping holder configured to arrange a display on a standing board defining a thickness direction is provided. The clamping holder includes a body, a connecting member, a first clamping member, and a second clamping member. The connecting member is disposed on the body and is connected to the display. The first clamping member is disposed on the body. When the body abuts against a side of the standing board and the second clamping member is assembled with the first clamping member, the second clamping member slides relative to the first clamping member in the thickness direction, such that the second clamping member abuts against the other side of the standing board, and the second clamping member and the body clamp the standing board together.

11 Claims, 10 Drawing Sheets

(56) References Cited

U.S. PATENT DOCUMENTS

| | | | | |
|---|---|---|---|---|
| 8,020,829 B1 * | 9/2011 | Tamayori | ............... | F16M 13/00 |
| | | | | 108/144.11 |
| 8,469,323 B1 * | 6/2013 | Deros | .................. | F16M 11/105 |
| | | | | 248/124.2 |
| 2010/0327129 A1 * | 12/2010 | Chen | ...................... | F16M 11/14 |
| | | | | 248/121 |
| 2011/0147546 A1 * | 6/2011 | Monsalve | .......... | F16M 11/2014 |
| | | | | 248/122.1 |
| 2012/0257346 A1 * | 10/2012 | Hulet | ..................... | G06F 1/166 |
| | | | | 248/316.4 |

* cited by examiner

CLAMPING HOLDER

CROSS-REFERENCE TO RELATED APPLICATION

This application claims the priority benefit of U.S. Provisional Application No. 63/056,724, filed on Jul. 27, 2020, U.S. Provisional Application No. 63/119,654, filed on Dec. 1, 2020 and Taiwan application serial no. 110200697, filed on Jan. 20, 2021. The entirety of each of the above-mentioned patent applications is hereby incorporated by reference herein and made a part of this specification.

BACKGROUND

Technical Field

The disclosure relates to a clamping holder, and in particular, relates to a clamping holder capable of adjusting a clamping thickness conveniently.

Description of Related Art

Open offices feature advantages such as open spaces and flexible layouts. In an open office, office automation (OA) furniture may be used to divide the office into individual office unit spaces, so the space of the office is saved and the office is uniformly organized. Due to the limitation of the size of each office unit, the area of the office desk top is generally small. After a computer monitor, bookshelves, and other office supplies are placed on the office desk, the remaining area is limited.

CN205298973U discloses a display suspension holder configured to mount a display onto an OA partition wall or a standing board. Further, the first tooth surface and the second tooth surface that may mesh with each other are provided, and the relative meshing position of the first tooth surface and the second tooth surface may be adjusted to correspond to partition walls of different thicknesses. A plurality of teeth are formed on the first tooth surface and the second tooth surface, and these teeth extend in a direction perpendicular to the thickness direction of the partition wall (that is, a rail extending in a direction perpendicular to the thickness direction of the partition wall is provided). As such, adjusting the relative position in a direction parallel to the thickness direction of the standing board induces interference among the teeth. So, the cross arm 21 may only be slid into the U-shaped groove 30 in a direction perpendicular to the thickness direction of the partition wall. In this way, assembly may not be easily performed, the screen is very likely scratched during assembling, and it is difficult to securely clamp the screen.

SUMMARY

The disclosure provides a clamping holder capable of adjusting a clamping thickness conveniently.

The disclosure provides a clamping holder configured to arrange a display on a standing board defining a thickness direction. The clamping holder includes a body, a connecting member, a first clamping member, and a second clamping member. The connecting member is disposed on the body and is connected to the display. The first clamping member is disposed on the body. When the body abuts against a side of the standing board and the second clamping member is assembled with the first clamping member, the second clamping member slides relative to the first clamping member in the thickness direction, such that the second clamping member abuts against the other side of the standing board, and the second clamping member and the body clamp the standing board together.

In an embodiment of the disclosure, the clamping holder further includes at least one rail extending in a direction parallel to the thickness direction, and the rail is disposed on one of the first clamping member and the second clamping member.

In an embodiment of the disclosure, the clamping holder further includes a forcing unit adapted to press the second clamping member and the first clamping member together in the thickness direction.

In an embodiment of the disclosure, the second clamping member has a horizontal portion and a vertical portion, and the vertical portion is configured to abut against the other side of the standing board.

In an embodiment of the disclosure, the clamping holder further includes a locking portion disposed on the second clamping member. The forcing unit includes a driving screw rod. The driving screw rod is idly inserted in the first clamping member and is screwed to the locking portion, and a relative position of the locking portion and the driving screw rod is adjusted through rotation of the driving screw rod.

In an embodiment of the disclosure, the forcing unit further includes a through hole formed on the first clamping member, and the driving screw rod is inserted in the through hole.

In an embodiment of the disclosure, the locking portion has a screw hole. The driving screw rod has a head portion and a rod body, the head portion is configured to abut against the first clamping member, and an external screw thread matched with the screw hole is formed on the rod body.

In an embodiment of the disclosure, the locking portion further includes a protrusion disposed on the horizontal portion of the second clamping member, and the screw hole is formed on the protrusion.

In an embodiment of the disclosure, the driving screw rod is a knob screw rod or a fast pressure screw rod.

In an embodiment of the disclosure, the clamping holder further includes a plurality of screwing members. The body has a fixing end, part of the screwing members penetrate through the first clamping member in a direction of gravity and are screwed to the fixing end, and the thickness direction is perpendicular to the direction of gravity.

In an embodiment of the disclosure, the first clamping member has a hollow body, the hollow body surrounds and defines the rail, and a horizontal portion of the second clamping member is slidably disposed on the rail.

In an embodiment of the disclosure, the horizontal portion of the second clamping member is a U-shaped plate matched with the hollow body.

In an embodiment of the disclosure, the clamping holder further includes a plurality of anti-scratch patches disposed in the rail.

To sum up, in the clamping holder provided by the disclosure, since the second clamping member may slide relative to the first clamping member, the clamping thickness (the distance between the second clamping member and the body) may be conveniently adjusted.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated

DESCRIPTION OF THE EMBODIMENTS

In a clamping holder provided by the disclosure, since a second clamping member may slide relative to a first clamping member, a user may be able to conveniently adjust a clamping thickness according to a thickness of an object to be clamped.

Specific embodiments are provided as follows to describe the clamping holder.

Figure 1A:
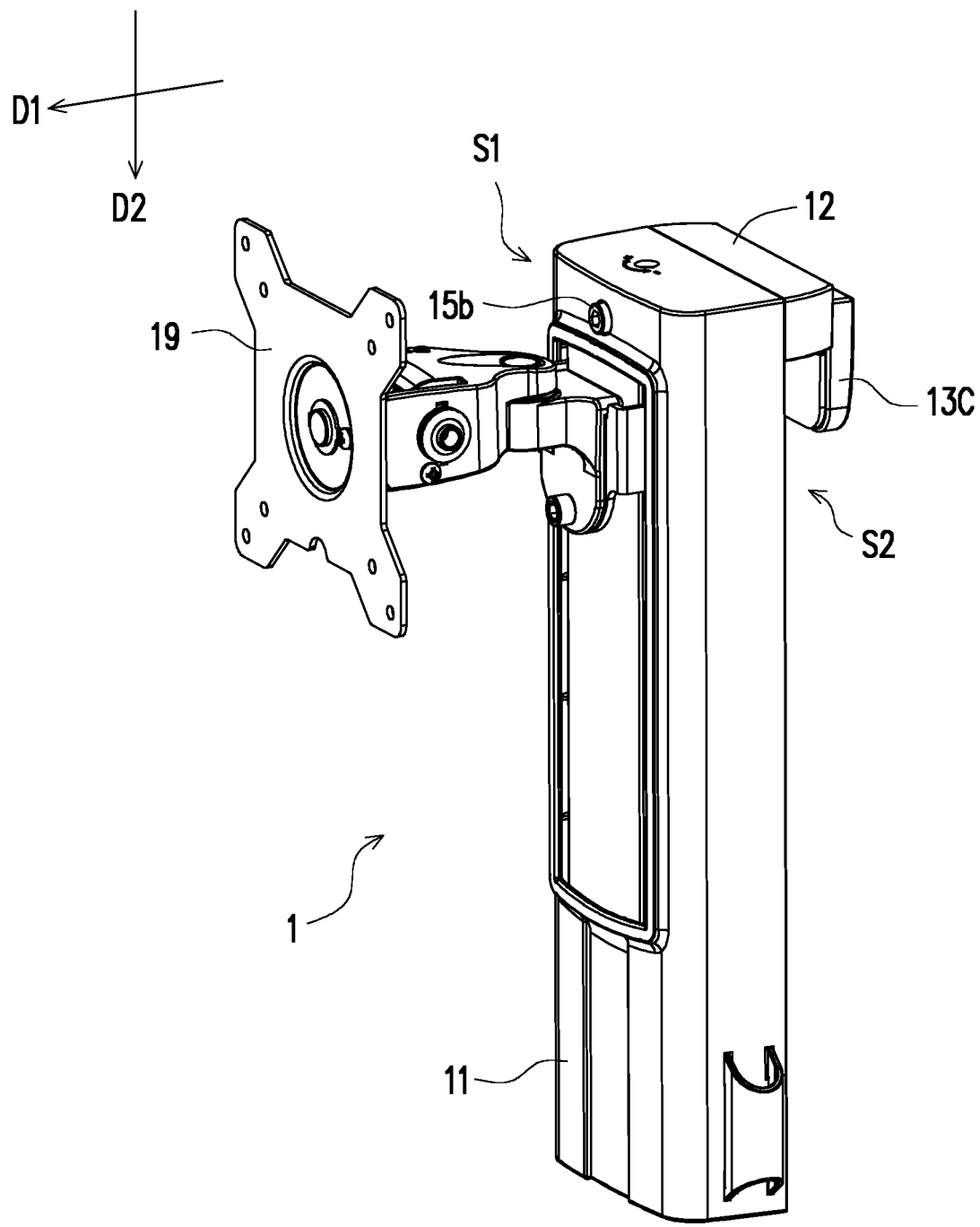
FIG. 1A and FIG. 1B are schematic views of a clamping holder from different viewing angles according to an embodiment of the disclosure.
Figure 1B:
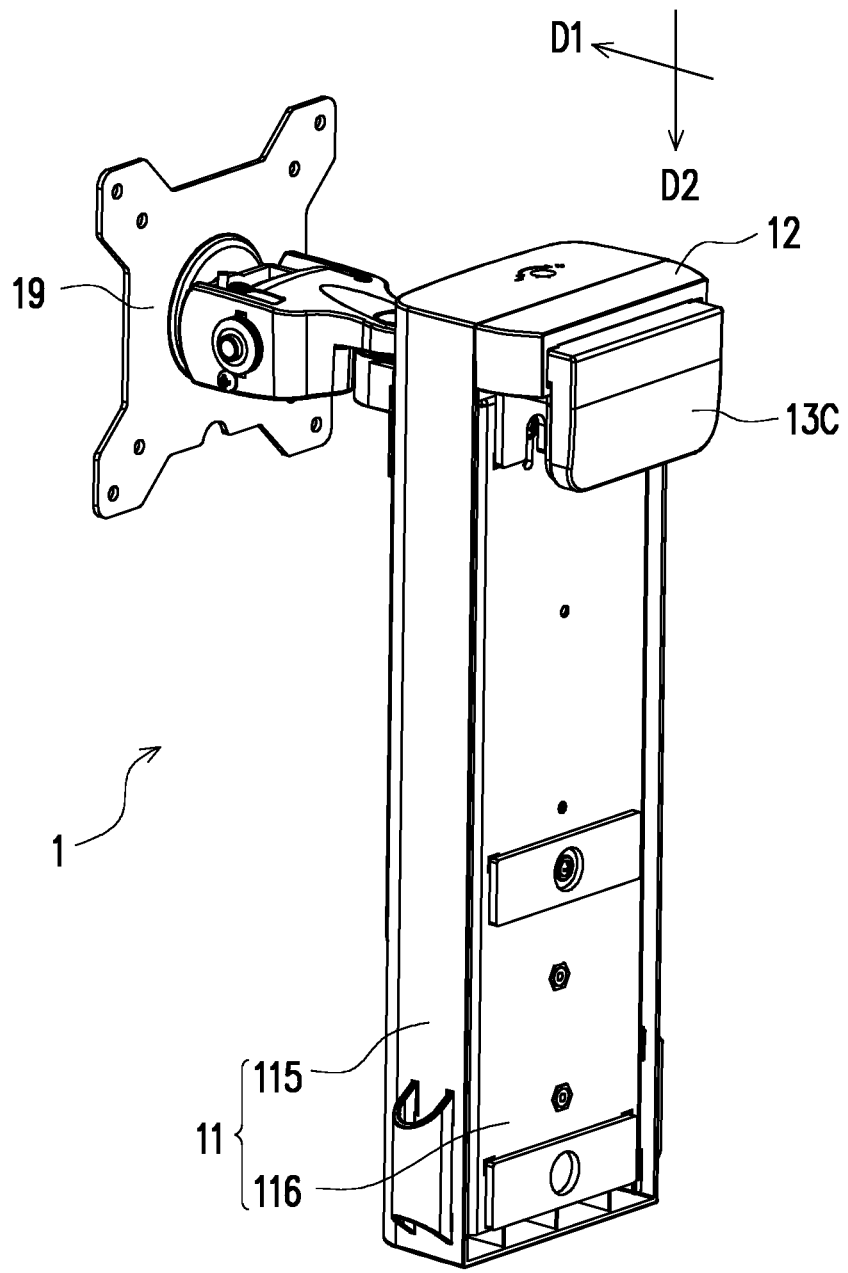
Figure 2A:
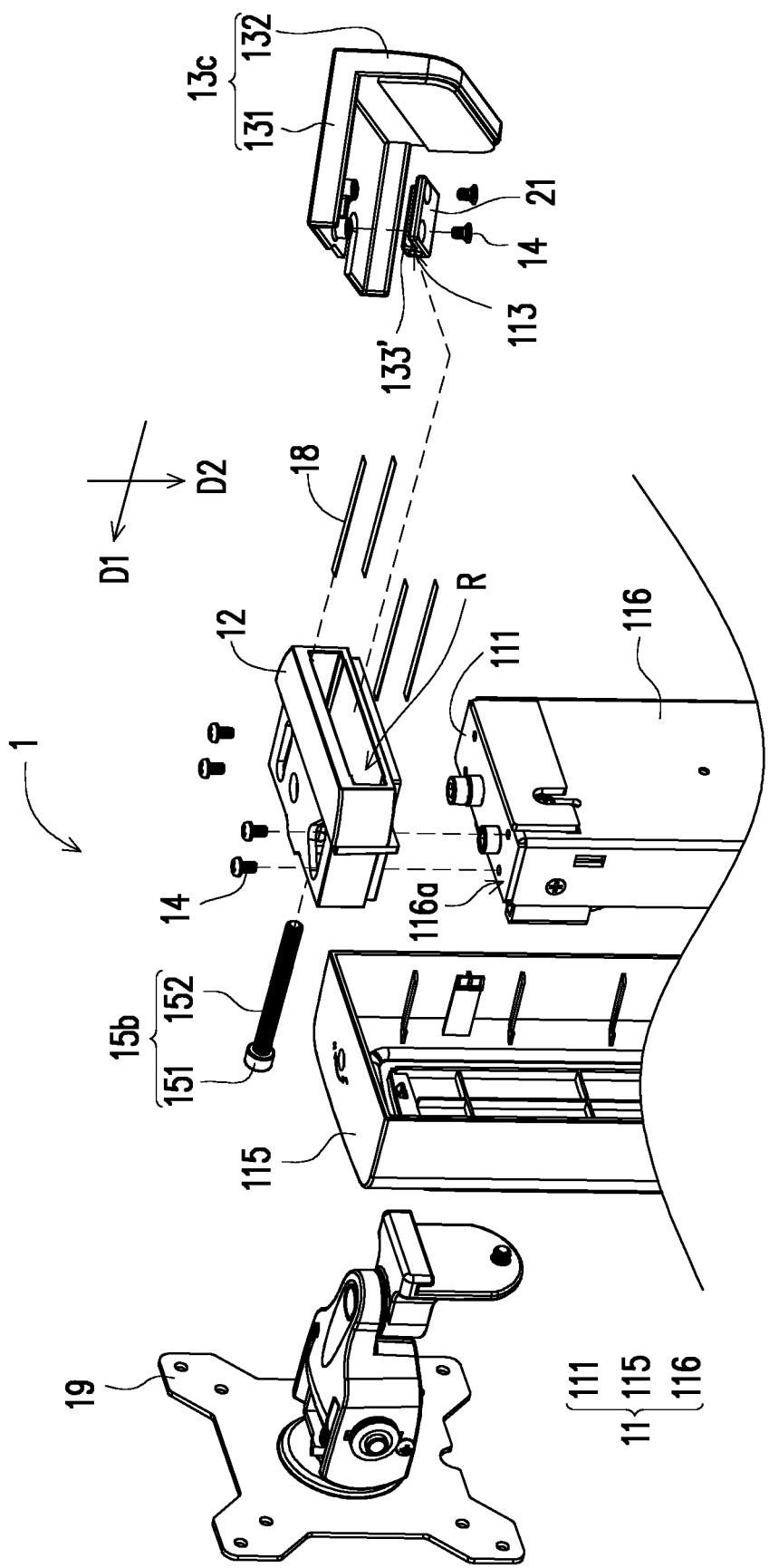
FIG. 2A is a local exploded schematic view of the clamping holder of FIG. 1.

FIG. 1A and FIG. 1B are schematic views of a clamping holder from different viewing angles according to an embodiment of the disclosure, and FIG. 2A is a partly exploded schematic view of the clamping holder of FIG. 1. With reference to FIG. 1A, FIG. 1B, and FIG. 2A together, a clamping holder 1 is configured to arrange a display 2 (shown in FIG. 4A) on a standing board 3 (e.g., a partition wall used in office automation (OA), shown in FIG. 3A), and the standing board 3 defines a thickness direction D1. The clamping holder 1 includes a body 11, a connecting member 19, a first clamping member 12, and a second clamping member 13c.

The body 11 is shaped as a rectangular column and may lean against the standing board 3 (a partition wall of OA) or an object to be clamped. In the thickness direction D1, the body 11 has a first side S1 and a second side S2 located on two opposite sides, and the connecting member 19 is disposed on the first side S1 of the body 11.

The body 11 includes an outer shell member 115 and an internal member 116, and the outer shell member 115 and the inner member 116 are embedded together. In this embodiment, the internal member 116 is, but not limited to, a metal material to provide sufficient supporting, and the outer shell member 115 is, but not limited to, a plastic material. The fixing end 111 is disposed on a top surface 116a of the internal member 116. In other embodiments, the body 11 may also be a one-piece body and is not formed by the outer shell member 115 and the internal member 116.

The first clamping member 12 is disposed on the body 11. To be specific, in a direction of gravity D2, the first clamping member 12 is embedded between the outer shell member 115 and the internal member 116. The direction of gravity D2 provided by the disclosure is perpendicular to the thickness direction D1. The first clamping member 12 has a hollow body, the hollow body surrounds and defines a rail R.

The second clamping member 13c is configured to be telescoped with the first clamping member 12. As such, the second clamping member 13c may slide relative to the first clamping member 12 in the thickness direction D1, and a distance between the second clamping member 13c and the body 11 is adjusted. In this way, as the body 11 abuts against a side of the standing board 3 (shown in FIG. 3A) and the second clamping member 13c abuts against the other side of the standing board 3, the body 11 and the second clamping member 13c may clam the standing board 3 together.

The second clamping member 13c has a horizontal portion 131 and a vertical portion 132. The horizontal portion 131 enters the first clamping member 12 from the second side S2 in the thickness direction D1 to be embedded into the rail R surrounded and defined by the hollow body of the first clamping member 12.

To be specific, the horizontal portion 131 is a U-shaped plate matched with the hollow body, and when the first clamping member 12 and the second clamping member 13c are telescoped, two side walls (e.g., upper and lower two side walls or left and right two side walls) of the U-shaped plate may slidably abut against the rail R surrounded and defined by the hollow body of the first clamping member 12. In such an arrangement manner, a combination of the second clamping member 13c and the first clamping member 12 may exhibit favorable strength, and the second clamping member 13c may stably slide relative to the first clamping member 12.

The clamping holder 1 further includes a plurality of screwing members 14, and the body 11 has the fixing end 111. The first clamping member 12 is placed on the fixing end 111, and part of the screwing members 14 penetrate through the first clamping member 12 from above the first clamping member 12 in the direction of gravity D2 and are fixed into the fixing end 111 to fix the first clamping member 12 on the body 11. A screwing direction in which the screwing members 14 are screwed to the fixing end 111 is different from a moving direction of the second clamping member 13c.

The second clamping member 13c further includes a locking portion 133'. The locking portion 133' has a screw hole 113, and an inner side of the screw hole 113 has a screw thread. As shown in FIG. 2A of this embodiment, the locking portion 133' is independent of the horizontal portion 131 of the second clamping member 13c, and that is, is formed on the external protrusion 21. In other embodiments, the locking portion 133' may also be integrally formed together with the horizontal portion 131 of the second clamping member 13c.

To be specific, part of the screwing members 14 penetrate through the protrusion 21 from below, in an opposite direction of the direction of gravity D2, and are locked into the horizontal portion 131 of the second clamping member 13c to fix the protrusion 21 to the second clamping member 13c.

The locking portion 133' has the screw hole 113, and the inner side of the screw hole 113 has an inner screw thread.

The clamping holder 1 also includes a forcing unit, and the forcing unit is a driving screw rod 15b. The driving screw rod 15b penetrates through the first clamping member 12 in the thickness direction D1 to be idly inserted in the first clamping member 12 (without an internal screw thread) and is screwed to the screw hole 113 of the locking portion 133'.

The driving screw rod 15b has a head portion 151 and a rod body 152, and the head portion 151 is configured to abut against the first clamping member 12. An outer thread matched with an internal screw thread of the screw hole 113 is formed on the rod body 152.

Figure 2B:
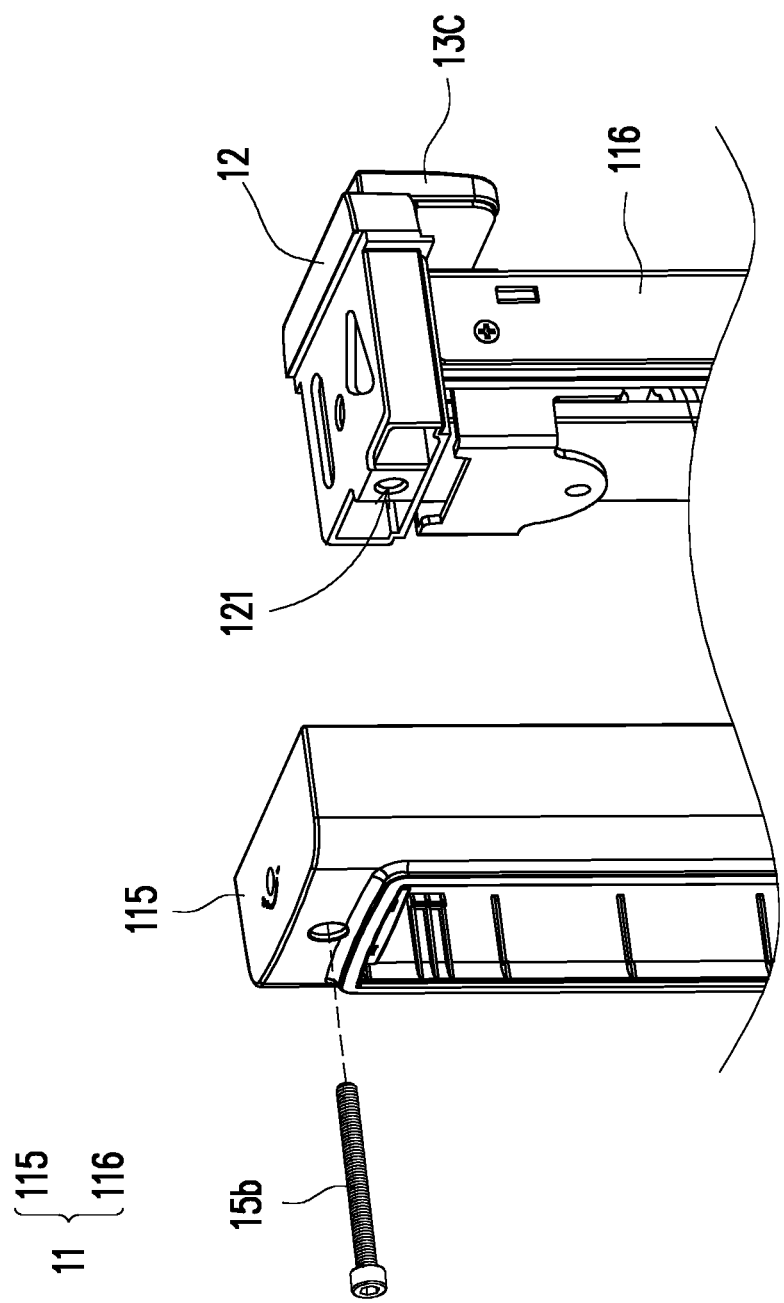
FIG. 2B is a local assembly view of FIG. 2A from another viewing angle.

FIG. 2B is a partially assembled configuration of FIG. 2A from another viewing angle. With reference to FIG. 2A and FIG. 2B together, the rod body 152 of the driving screw rod 15b penetrates through a through hole 121 of the first clamping member 12. A diameter of the through hole 121 of the first clamping member 12 is considerably greater than a diameter of the rod body 152, so the outer thread of the rod body 152 does not interfere with the through hole 121, and that the rod body 152 may rotate idly in the through hole 121.

An end of the rod body 152 is further locked into the screw hole 113 of the locking portion 133'. Therefore, when the driving screw rod 15b is rotated, as the outer thread of the rod body 152 of the driving screw rod 15b is matched with the screw thread on the inner side of the screw hole 113, a relative position of the second clamping member 13c and the driving screw rod 15b may thus be adjusted. In this way, the distance between the vertical portion 132 of the second clamping member 13c and the body 11 may be adjusted, so that the clamping holder 1 may be applied to OA objects such as screen partitions or desktops with different thicknesses.

The clamping holder 1 further includes a plurality of anti-scratch patches 18, and the anti-scratch patches 18 are disposed on an inner surface of the first clamping member 12. The anti-scratch patches 18 not only provide buffering to allow the second clamping member 13c to slide and move smoothly relative to the first clamping member 12, but also prevent the second clamping member 13c and the first clamping member 12 from rubbing against each other and wearing when the second clamping member 13c slides relative to the first clamping member 12.

Figure 3A:
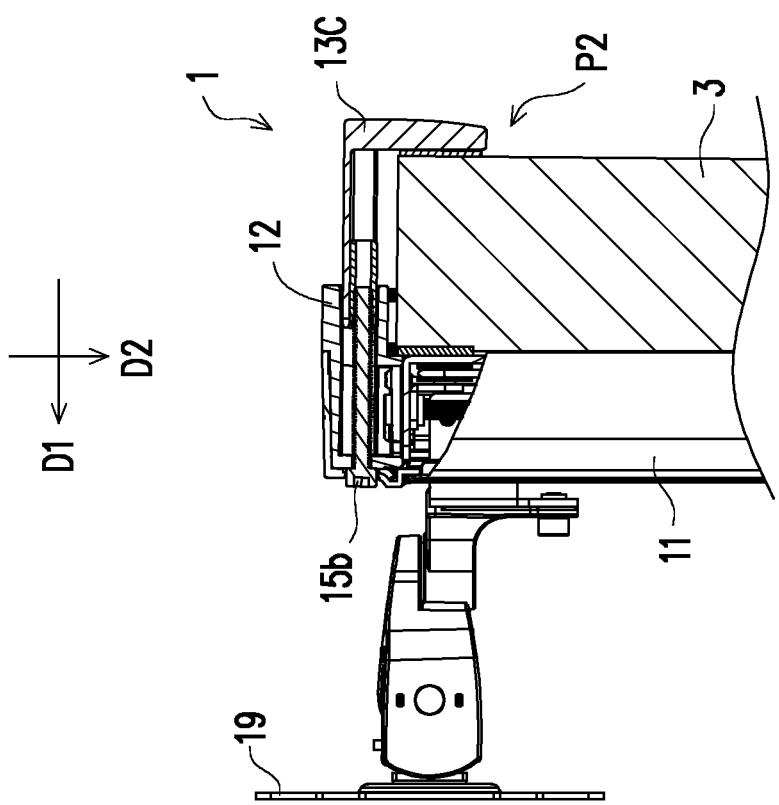
FIG. 3A is a cross-sectional schematic view of a second clamping member located in a first position.
Figure 3B:
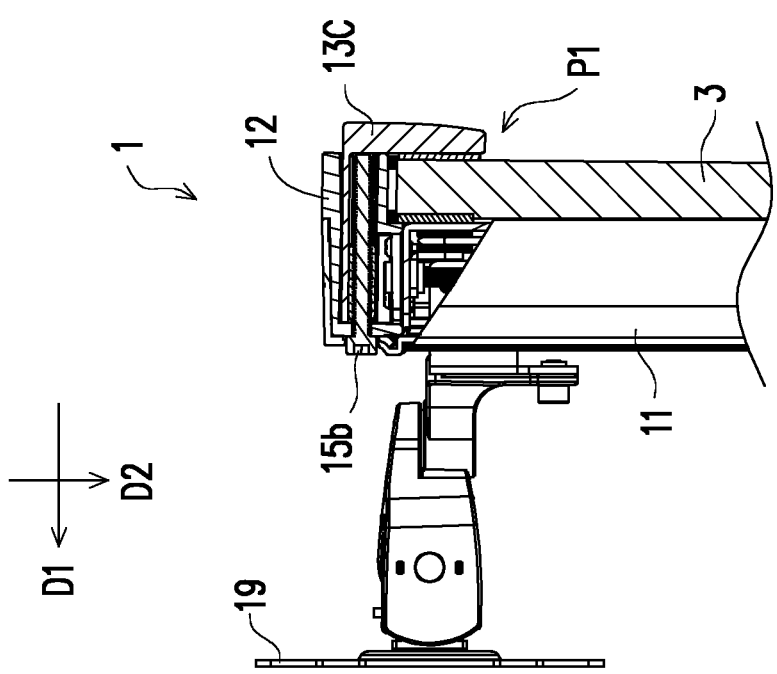
FIG. 3B is a cross-sectional schematic view of the second clamping member located in a second position.

FIG. 3A is a cross-sectional schematic view of a second clamping member located in a first position, and FIG. 3B is a cross-sectional schematic view of the second clamping member located in a second position. With reference to FIG. 3A and FIG. 3B together, when the second clamping member 13c is located in a first position P1, a gap between the vertical portion 132 of the second clamping member 13c and the body 11 is decreased. That is, the clamping holder 1 is clamped on the standing board 3 with a thin thickness.

Next, with reference to FIG. 3A, FIG. 3B, and FIG. 2A together, a depth of the end of the driving screw rod 15b locked into the locking portion 133' is adjusted, and in this way, the gap between the vertical portion 132 of the second clamping member 13c and the body 11 is changed. As shown in the state in FIG. 3B, when the second clamping member 13c is located in a second position P2, the gap between the vertical portion 132 of the second clamping member 13c and the body 11 is increased, so the clamping holder 1 may be clamped on the standing board 3 with a thick thickness.

Incidentally, a material of the protrusion 21 may be different from a material of the first clamping member 12 and the second clamping member 13c.

To be specific, in consideration of an overall weight of the clamping holder, the material of the first clamping member 12 and the second clamping member 13c may selectively be aluminum or aluminum alloy. Aluminum or aluminum alloy is ductile, so it is prone to deformation when encountering considerable stress.

In this embodiment, the protrusion 21 independent of the second clamping member 13c is selectively made of iron or iron alloy. Further, since iron or iron alloy has better strength (hardness) than aluminum and has worse ductility than aluminum or aluminum alloy, deformation of the locking portion 133' caused by a force of locking when the driving screw rod 15b is locked to the locking portion 133' is highly prevented.

Figure 4A:
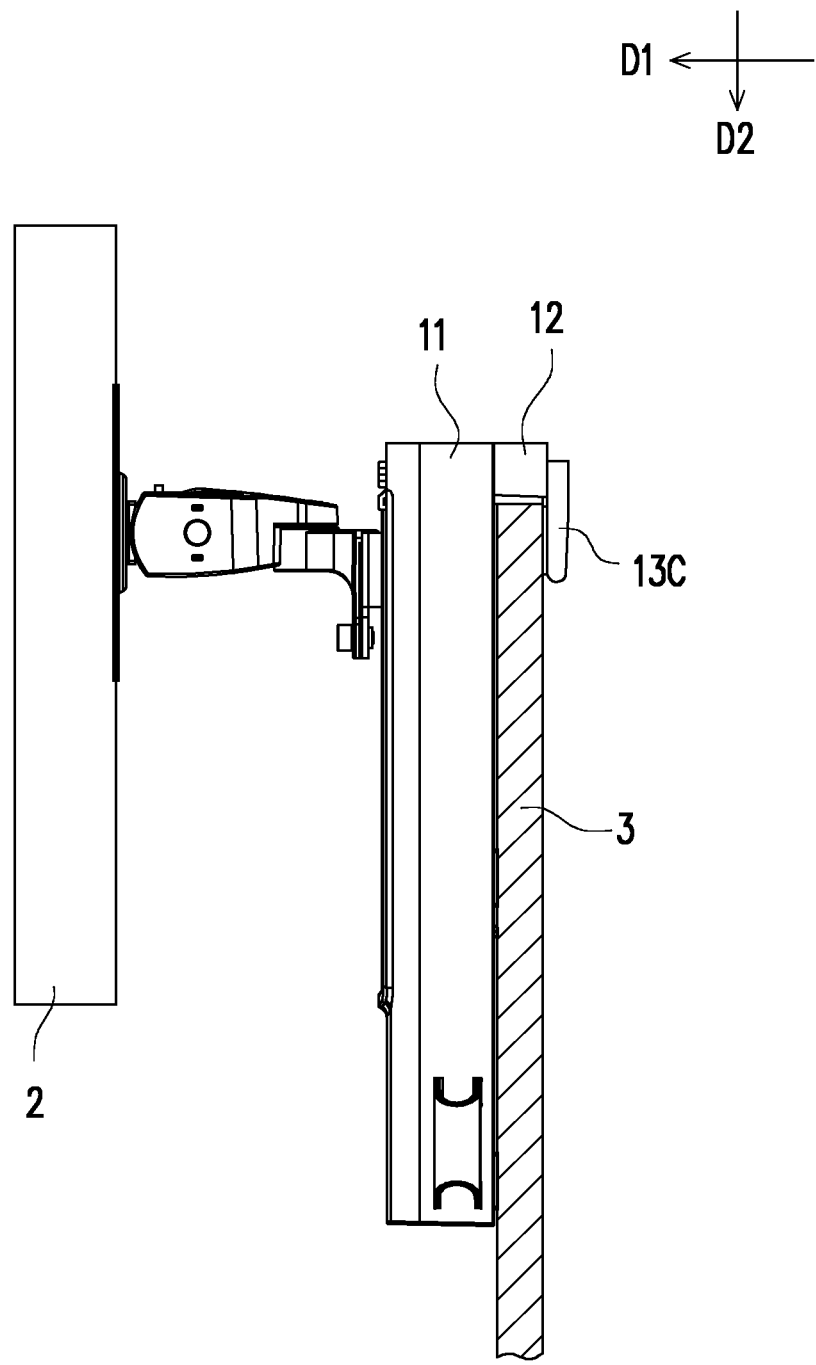
FIG. 4A and FIG. 4B are schematic views of clamping of a display screen performed by the clamping holder of FIG. 1 and height adjustment relative to a body performed by a connecting member.
Figure 4B:
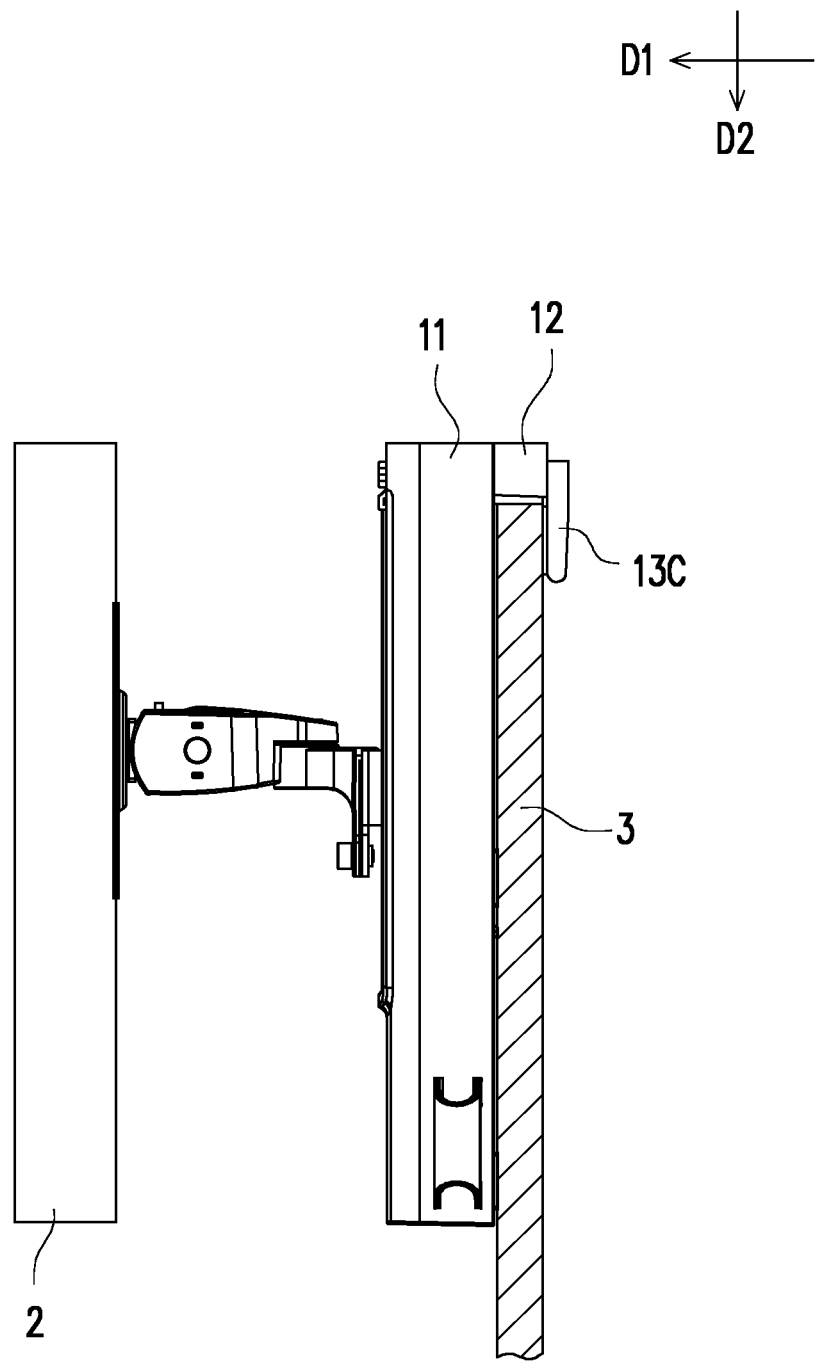

FIG. 4A and FIG. 4B are schematic views of clamping of a display screen performed by the clamping holder of FIG. 1 and height adjustment relative to a body performed by a connecting member. With reference to FIG. 4A and FIG. 4B together, the connecting member 19 configured to be connected to a display screen 2 and assembled to the body 11 may be lifted and lowered relative to the body 11 in the direction of gravity D2 to adjust a height. Further, such lifting and lowering are achieved by, but not limited to, a sliding rail, a pulley, and a constant force spring installed in the body 11, for example.

Figure 4C:
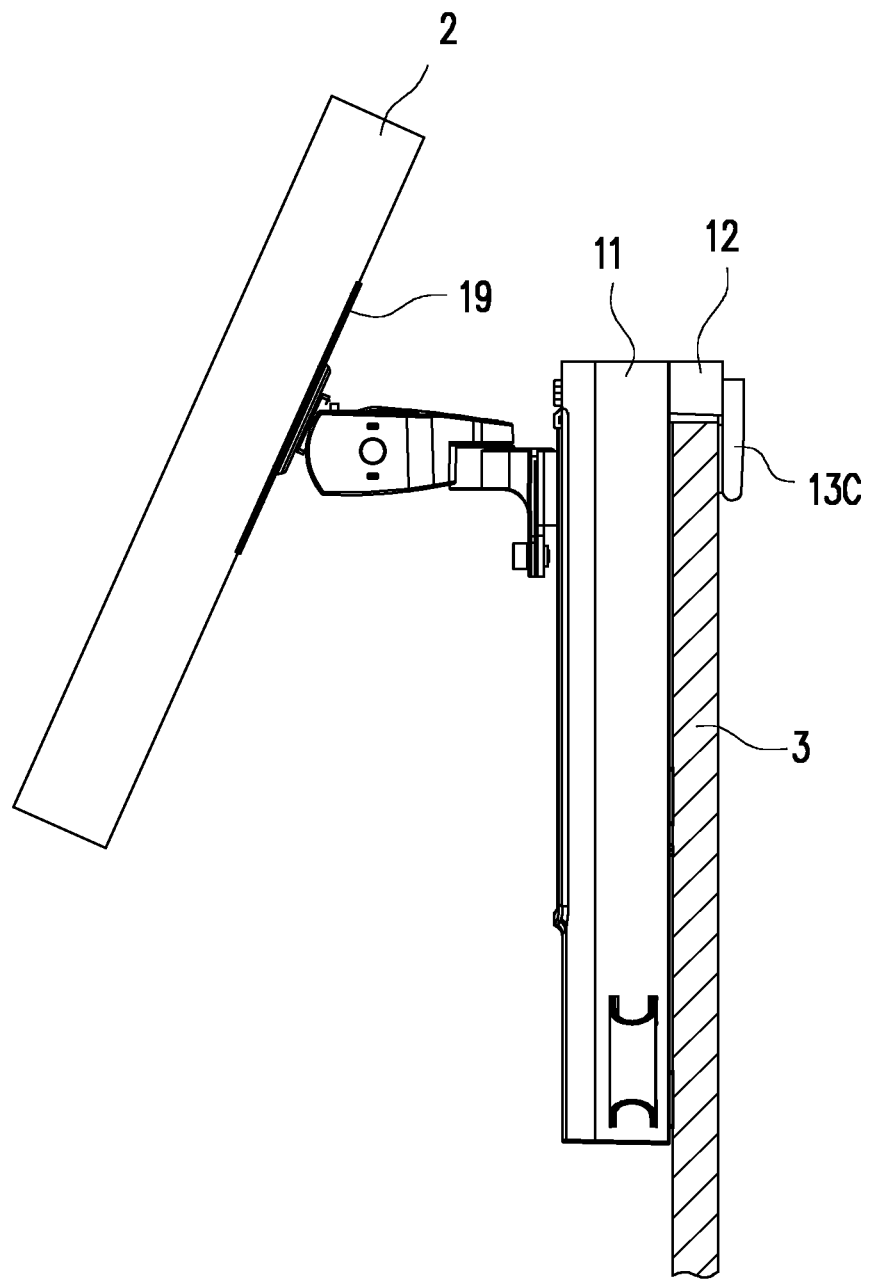
FIG. 4C is a schematic view of rotation of the connecting member relative to the body.

FIG. 4C is a schematic view of rotation of the connecting member 19 relative to the body 11. With reference to FIG. 4A and FIG. 4C together, the connecting member 19 may further be rotated relative to the body 11 to adjust an elevation angle or a depression angle (that is, a tilting function) of the display screen 2 installed at the connecting member 19 relative to the user or to adjust a horizontal viewing angle (that is, a swiveling function). To be specific, the connecting member 19 rotates relative to the body 11 in a third direction D3 acting as an axis of rotation and perpendicular to the direction of gravity D2. The thickness direction D1, the direction of gravity D2, and the third direction D3 are mutually perpendicular directions. Generally, the above-mentioned rotation is achieved through a hinge respectively, and description thereof is not provided herein.

Figure 5A:
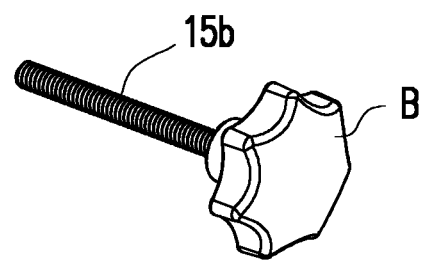
FIG. 5A and FIG. 5B are schematic views of different implementations of a driving screw rod.
Figure 5B:
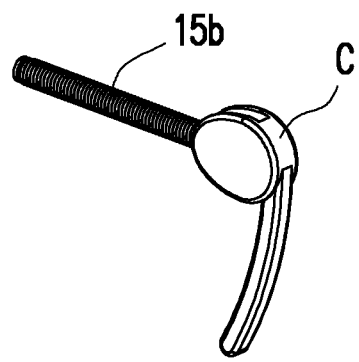

FIG. 5A and FIG. 5B are schematic views of different implementations of a driving screw rod. The aforementioned adjustment of the depth of the driving screw rod 15b locked into the locking portion 133' may be achieved by using a hand tool (not shown), such as a screwdriver. Nevertheless, in other embodiments, the driving screw rod 15b may be a knob screw rod (the head portion is directly a knob B), as shown in FIG. 5A, or a clamping cam-lever (quick releasing and locking) screw rod (having a cam-lever C), as shown in FIG. 5B, to facilitate operation of the user and eliminate the use of hand tools.

Figure 6:
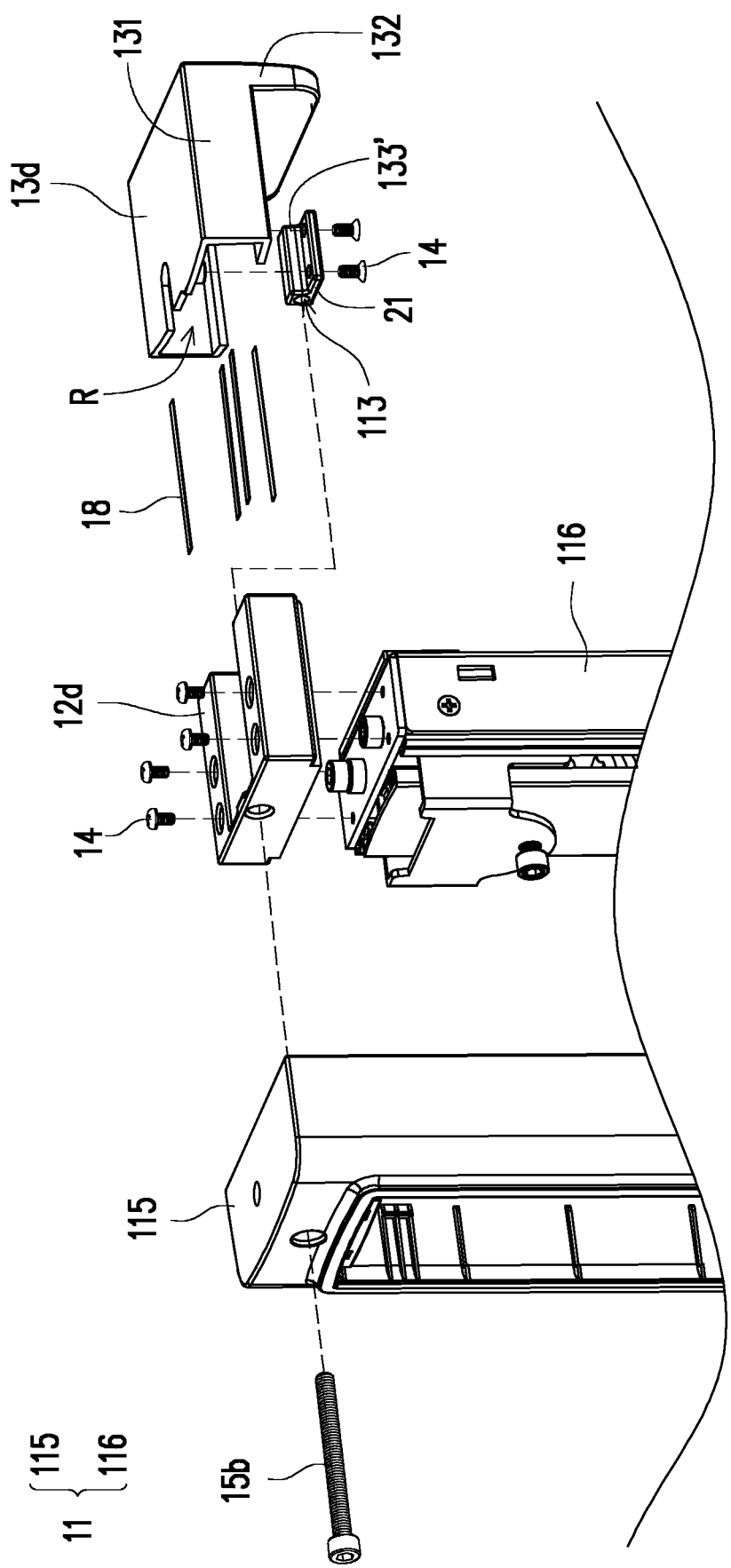
FIG. 6 is a schematic view of a rail defined by the second clamping member and a corresponding shape change of a first clamping member.

Incidentally, the rail R shown in FIG. 2A is defined by the hollow body of the first clamping member 12. Nevertheless, in other embodiments, the rail R may also be defined by the second clamping member 13c, and a shape of the first clamping member 12d may be accordingly modified, as shown in FIG. 6.

As described above, the horizontal portion 131 of the second clamping member 13d has the hollow body and surrounds and defines the rail R, and a portion of the first clamping member 12 and the rail R are telescoped.

Although it is not shown, a person having ordinary skill in the art may apply a nut and a washer to the clamping holder provided by the disclosure according to actual needs, so as to further press the locking force of the driving screw rod 15b.

In view of the foregoing, the distance between the vertical portion of the second clamping member and the body may be conveniently and quickly adjusted corresponding to the thickness of the OA partition wall or the object to be clamped; therefore, the second clamping member provided by the disclosure may be suitable for OA partition walls or objects to be clamped with various thicknesses and exhibits universality.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A clamping holder, configured to arrange a display on a standing board, the standing board defining a thickness direction, wherein the clamping holder comprises:
   a body;
   a connecting member, disposed on the body, connected to the display;
   a first clamping member, disposed on the body; and
   a second clamping member;
   a forcing unit, wherein the forcing unit is adapted to press the second clamping member and the first clamping member together in the thickness direction; and
   a locking portion disposed on the second clamping member, wherein the forcing unit comprises a driving screw rod, the driving screw rod is idly inserted in the first clamping member and is screwed to locking portion, and a relative position of the locking portion and the driving screw rod is adjusted through rotation of the driving screw rod,
   wherein the second clamping member is slidable in the first clamping member in the thickness direction when the body abuts against a side of the standing board and the second clamping member is assembled with the first clamping member, such that the second clamping member abuts against the other side of the standing board, and the second clamping member and the body clamp the standing board together.

2. The clamping holder according to claim 1, further comprising at least one rail extending in a direction parallel to the thickness direction, wherein the at least one rail is disposed on one of the first clamping member and the second clamping member.

3. The clamping holder according to claim 2, wherein the first clamping member has a hollow body, the hollow body surrounds and defines the at least one rail, and a horizontal portion of the second clamping member is slidably disposed on the at least one rail.

4. The clamping holder according to claim 3, wherein the horizontal portion of the second clamping member is a U-shaped plate matched with the hollow body.

5. The clamping holder according to claim 2, further comprising a plurality of anti-scratch patches disposed on an inner surface of the first clamping member.

6. The clamping holder according to claim 1, wherein the second clamping member has a horizontal portion and a vertical portion, and the vertical portion is configured to abut against the other side of the standing board.

7. The clamping holder according to claim 1, wherein the forcing unit further comprises a through hole formed on the first clamping member, and the driving screw rod is inserted in the through hole.

8. The clamping holder according to claim 7, wherein the locking portion has a screw hole, the driving screw rod has a head portion and a rod body, the head portion is configured to abut against the first clamping member, and an external screw thread matched with the screw hole is formed on the rod body.

9. The clamping holder according to claim 8, wherein the locking portion further comprises a protrusion disposed on the horizontal portion of the second clamping member, and the screw hole is formed on the protrusion.

10. The clamping holder according to claim 1, wherein the driving screw rod is a knob screw rod or a clamping cam-lever screw rod.

11. The clamping holder according to claim 1, further comprising a plurality of screwing members, wherein the body has a fixing end, part of the screwing members penetrate through the first clamping member in a direction of gravity and are screwed to the fixing end, and the thickness direction is perpendicular to the direction of gravity.

* * * * *